United States Patent
Renfroe

[15] 3,645,578
[45] Feb. 29, 1972

[54] EASY HOLE DIGGER

[72] Inventor: Charles L. Renfroe, 506 Coronado Avenue, Roseville, Calif. 95678

[22] Filed: Jan. 29, 1970

[21] Appl. No.: 6,891

[52] U.S. Cl............................294/50.9, 294/53.5, 294/49
[51] Int. Cl. .........................................................A01b 1/02
[58] Field of Search...............................................294/50.9

[56] References Cited

UNITED STATES PATENTS 3,369,834   2/1968   Miles....................................294/50.9

FOREIGN PATENTS OR APPLICATIONS 32,263   12/1961   Finland................................294/50.9

*Primary Examiner*—Evon C. Blunk
*Assistant Examiner*—I. Kenneth Silverman

[57] ABSTRACT

A digging implement for making holes of generally narrow but relatively large depth, the implement comprising a handle supported to a working head, the working head comprising a spade blade that is transversely, centrally divided and connected pivotally free together so that the tip member of the spade blade can be moved between a straight to a perpendicular direction so that it may be used for digging and also raising dirt upwardly from within a hole.

1 Claims, 3 Drawing Figures

Patented Feb. 29, 1972
3,645,578
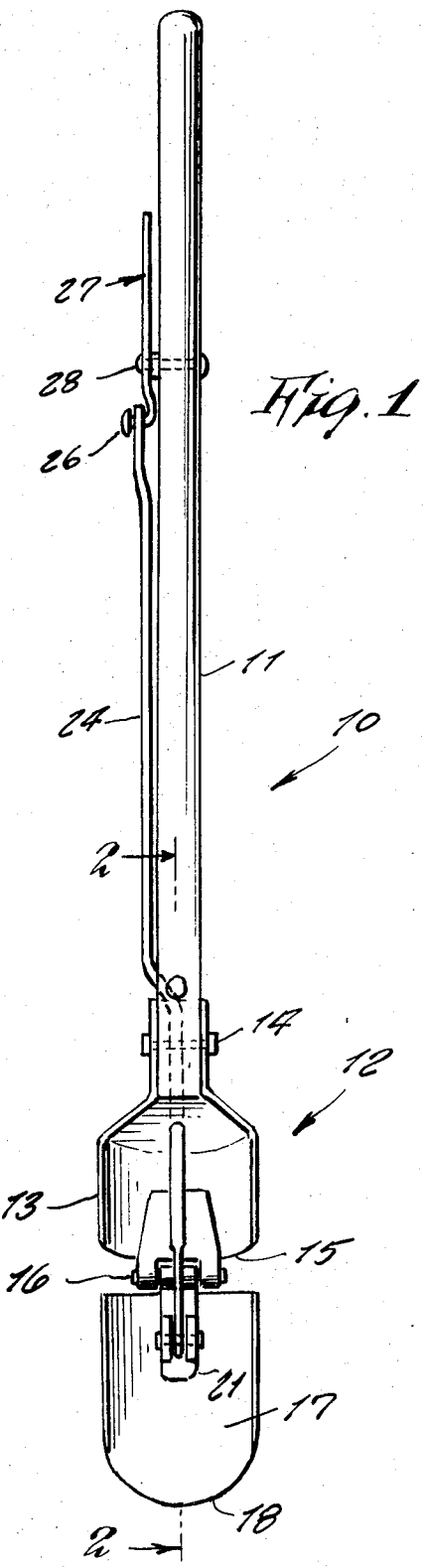
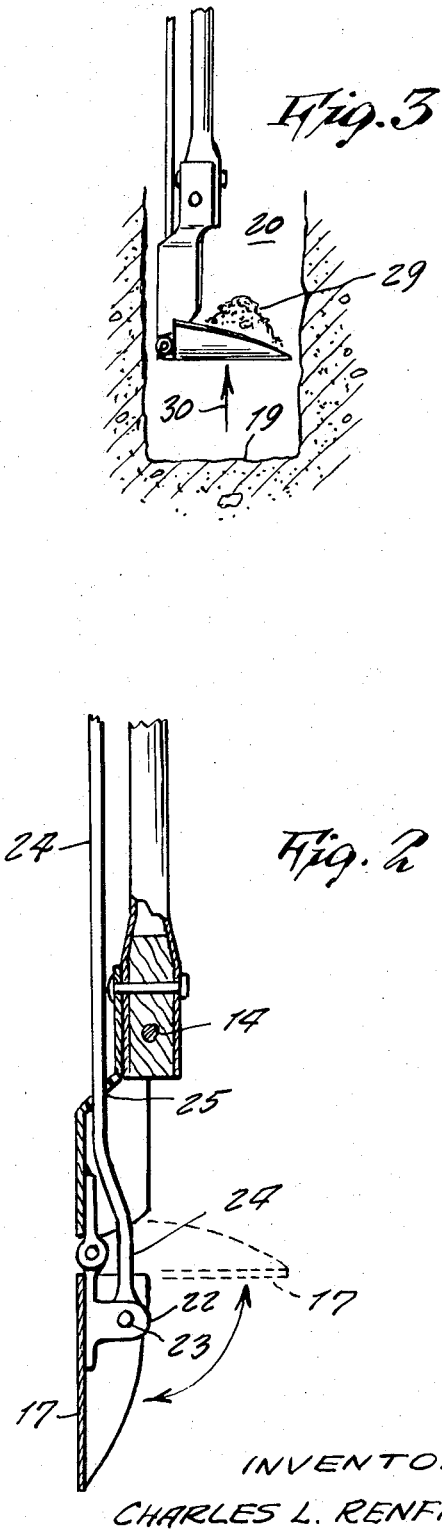
INVENTOR
CHARLES L. RENFROE

EASY HOLE DIGGER

This invention relates generally to hole diggers, such as are used for making post holes.

A principle object of the present invention is to provide an easy hole digger that is designed to dig deeper holes of any size without the obstruction of the handle getting in the way for lifting dirt out of the hole.

Still another object of the present invention is to provide an easy hole digger that permits digging a hole of relatively narrow width, thereby eliminating the necessity of moving a large quantity of earth in order to dig to a relatively greater depth.

Yet a further object of the present invention is to provide an easy hole digger employing a novel spade blade having self-contained means to dig downwardly into the earth for loosening the dirt, and wherein the blade is pivotable in part so as to form a horizontal support upon which the loosened dirt may be pulled vertically upwardly out of the hole.

Other objects of the present invention are to provide an easy hole digger which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention,

FIG. 2 is an enlarged cross-sectional view taken on the line 2—2 of FIG. 1, and

FIG. 3 is a side elevation of the present invention shown in operative use raising a quantity of loosened earth from the bottom of an opening in the ground by moving it directly vertically upwards.

Referring now to the drawing in detail, the reference numeral 10 represents an easy hole digger according to the present invention wherein there is a handle 11 which is connected at one end to a working head 12 comprising a novel spade blade.

The spade head includes a stationary blade 13 fitted round the terminal end of the handle 11 and secured thereto by means of transverse extending rivets 14. The stationary blade member 13 has an extension beyond the end of the handle which is sidewardly flared outwardly into an arcuate configuration so as to be of generally smooth shape.

Adjacent the leading edge 15 of the stationary blade 13, there is a hinge 16 secured to the inner side of the member 13, the opposite component of the hinge 16 being secured to a pivotable spade blade member 17.

The blade member 17 is of generally arcuate configuration transversely at the member 13 so that together they form a continuous configuration of a spade blade.

The leading edge 18 of the pivotable blade member 17 is rounded or pointed so that the same may be forced downward into the surface 19 in the bottom of a hole 20.

The member 21 of the hinge 16 which is attached to the pivotable member 17 has an extension 22 with a pin 23 extending therethrough and to which there is attached one end of a rod 24 that extends through an opening 25 in the stationary blade member 13, the rod 24 then extending parallel to the handle 11 over a major portion thereof, the opposite end of the rod 24 being connected pivotally free to one end 26 of a lever 27 that is centrally pivotable about a pin or rivet 28 extending transversely through the handle 11.

In operative use, when the lever 27 is moved so that the pivotable blade member 17 is in alignment with the stationary blade member 13 so that they form a continuous spade configuration, as shown in FIG. 2 by the solid lines, the device may then be used for digging downwardly in the bottom of a hole 20 thus loosening the dirt in the bottom thereof.

When it is desired to lift the loosened dirt out of the bottom of the opening 20 in the ground, the lever 27 is flipped so that the rod 24 is pulled upwardly along side the handle 11, thus causing the pivotable blade member 17 to pivot about the hinge 16 so as to assume the position as indicated by the phantom lines in FIG. 2.

In this position, as shown in FIG. 3 of the drawing, a quantity of dirt 29 placed upon the pivotable blade member 17 can be transported upwardly out of the hole 20 by moving the implement directly vertical as shown in arrow 30.

Thus an implement is provided for digging relatively narrow holes and to a relatively great depth, thereby eliminating the necessity of moving large quantities of dirt so as to attain such depth.

What I now claim is:

1. In an easy hole digger, the combination of a manually operated implement including a handle, one end of said handle being connected to a spade working head, said spade working head being comprised of a stationary blade member and a pivotal blade member secured pivotally free to said stationary blade member, said stationary member being secured to the end of said handle, said stationary blade member extending beyond the end of said handle being sidewardly outwardly flared into an awkward configuration so as to assume a spoon shape, and said stationary blade member having a leading edge positioned adjacent said pivotal blade member, said pivotal blade member being attached to said stationary blade member by means of a hinge, said hinge including a plate secured on said stationary blade member and a plate secured upon said pivotable blade member, said plate upon said pivotable blade member having one end of an upward extension secured pivotally free there to by means of a transverse pin, a lower portion of said extension being located forwardly of said pivotal and stationary blade members, and intermediate portion of said extension extending through an opening in a diagonal portion of said stationary blade member so that the upper portion of said extension is located adjacent a rear side of said handle, and the upper end of said extension being connected pivotal free to one end of a hand lever that is centrally pivotal about a pin extending transversely through said handle.

* * * * *